(12) United States Patent
Houlihan et al.

(10) Patent No.: US 8,122,269 B2
(45) Date of Patent: Feb. 21, 2012

(54) REGULATING POWER CONSUMPTION IN A MULTI-CORE PROCESSOR BY DYNAMICALLY DISTRIBUTING POWER AND PROCESSING REQUESTS BY A MANAGING CORE TO A CONFIGURATION OF PROCESSING CORES

(75) Inventors: John Richard Houlihan, Round Rock, TX (US); Dilton Monroe McGowan, II, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/349,909

(22) Filed: Jan. 7, 2009

(65) Prior Publication Data

US 2010/0174923 A1 Jul. 8, 2010

(51) Int. Cl.
*G06F 1/00* (2006.01)
*G06F 1/26* (2006.01)
*G06F 1/32* (2006.01)
*G06F 9/46* (2006.01)
*G06F 15/00* (2006.01)
*G06F 15/76* (2006.01)

(52) U.S. Cl. .............. 713/320; 713/300; 712/1; 712/10; 718/104

(58) Field of Classification Search ................ 712/1, 10; 713/300, 320; 718/104
See application file for complete search history.

(56) References Cited

U.S. PATENT DOCUMENTS

| | | | | |
|---|---|---|---|---|
| 7,636,863 | B2 * | 12/2009 | Oh ................................. | 713/320 |
| 2003/0163659 | A1 * | 8/2003 | Audrain ........................ | 711/169 |
| 2004/0215987 | A1 * | 10/2004 | Farkas et al. .................. | 713/300 |
| 2006/0212677 | A1 * | 9/2006 | Fossum ............................ | 712/1 |
| 2006/0279152 | A1 * | 12/2006 | Ha ................................ | 310/114 |
| 2006/0288243 | A1 * | 12/2006 | Kim ............................... | 713/300 |
| 2007/0198863 | A1 * | 8/2007 | Bose et al. .................... | 713/300 |
| 2008/0028236 | A1 * | 1/2008 | Capps et al. .................. | 713/300 |
| 2008/0052428 | A1 * | 2/2008 | Liang et al. ..................... | 710/62 |
| 2008/0065770 | A1 * | 3/2008 | Romero et al. ............... | 709/226 |
| 2008/0263324 | A1 * | 10/2008 | Sutardja et al. ................. | 712/43 |
| 2010/0299541 | A1 * | 11/2010 | Ishikawa et al. .............. | 713/300 |

OTHER PUBLICATIONS

Gschwind, Michael; "The Cell Architecture: Innovation Matters" 5 pages; IBM Research; International Business Machines, USA http://domino.research.ibm.com/comm/research.nsf/pages/r.arch.innovation.html.

\* cited by examiner

*Primary Examiner* — Mark Connolly
(74) *Attorney, Agent, or Firm* — D'Ambrosio & Menon, LLP; Srikant Viswanadham

(57) ABSTRACT

Methods, systems, and design structures for providing power-regulated multi-core processing. The method includes determining a configuration of processing cores for optimal power consumption. The configuration of processing cores for optimal power consumption comprises a managing core and zero or more active processing cores wherein the active processing cores are selected from one or more available processing cores operatively coupled to the managing core. The managing core receives processing requests and processes them by dynamically retaining or distributing power to the configuration of processing cores. The managing core presents an appearance of a single core to an electronic system comprising the processing cores.

20 Claims, 8 Drawing Sheets

REGULATING POWER CONSUMPTION IN A MULTI-CORE PROCESSOR BY DYNAMICALLY DISTRIBUTING POWER AND PROCESSING REQUESTS BY A MANAGING CORE TO A CONFIGURATION OF PROCESSING CORES

BACKGROUND

Since the earliest days of electrical computing, processors have been utilized to perform various tasks by executing computer program instructions stored in electronic memory. As time passed, various technological developments facilitated building smaller and more reliable electronic devices. Processors manufactured as a single integrated circuit became prevalent. Implementing a processor on a single die resulted in a smaller processor size and, thus, faster switching times. As processing capabilities increased and size decreased, personal computers using these processors gained popularity. The decrease in size has also allowed the use of embedded processors in everyday modern devices, such as personal electronics, automobiles, and industrial machinery.

More recently, multi-core processors have been developed that combine two or more independent processing cores into a single package having a single integrated circuit ('IC'). Each processing core includes processing circuitry implemented in the IC, which enables performance gains. However, special programming is required so that software executed by the multi-core processor can take advantage of the multi-core architecture, which increases design complexity and makes software development more difficult. In addition, multi-core processors may use more power than traditional single core processors.

SUMMARY

A first embodiment of the present invention includes a method for providing power-regulated transparent multi-core processing by determining a configuration of processing cores for optimal power consumption. The configuration of processing cores for optimal power consumption comprises a managing core and zero or more active processing cores wherein the active processing cores are selected from one or more available processing cores operatively coupled to the managing core. The managing core receives processing requests and processes them by dynamically retaining or distributing power to the configuration of processing cores. The managing core presents an appearance of a single core to an electronic system comprising the processing cores.

Determining the configuration of processing cores for optimal power consumption may be carried out by determining whether a processing load has exceeded a current aggregate processing capacity for a duration of time not less than a core startup latency value; and incrementing the number of active processing cores in the configuration of processing cores for optimal power consumption if the processing load has exceeded the current aggregate processing capacity for the duration of time not less than the core startup latency value. The method may include determining the core startup latency value in dependence upon at least one of an average processing load and remaining power of a battery power source.

Determining the configuration of processing cores for optimal power consumption may also be carried out by determining whether a processing load has remained below a processing capacity corresponding to a lower power configuration of processing cores for a duration of time not less than a core quiescence time value; and decrementing the number of active processing cores in the configuration of processing cores for optimal power consumption so that the configuration of processing cores corresponds to the lower power configuration of processing cores if the processing load has remained below the processing capacity corresponding to the lower power configuration of processing cores for the duration of time not less than the core quiescence time value. The method may include determining the core quiescence time value in dependence upon at least one of an average processing load and remaining power of a battery power source.

Another embodiment of the present invention includes a managing core configured to be operatively coupled to one or more available processing cores and a power source for providing power-regulated transparent multi-core processing. The managing core may include a memory for storing threshold values. The managing core also includes an operational conditions monitoring circuit configured to determine operational conditions, an optimizing circuit configured to compare operational conditions with the threshold values to determine a configuration of processing cores for optimal power consumption including the managing core and zero or more active processing cores selected from one or more available processing cores, and a load distributor circuits configured to distribute power to the one or more available processing cores so that an actual configuration of processing cores corresponds to the configuration of processing cores. The managing core also includes input circuits configured to receive a processing request configured for execution by a single core, and programmed logic circuits configured to assign the processing request to one of the processing cores in the actual configuration of processing cores. The managing core and the one or more available processing cores may be embedded cores.

Another embodiment of the present invention is a system including the managing core operatively coupled to a power source and one or more available processing cores configured to execute processing requests for providing power-regulated transparent multi-core processing. The system may be an integrated circuit.

Another embodiment of the present invention includes a design structure embodied in a machine readable storage medium for at least one of designing, manufacturing, and testing a design. The design structure includes a managing core configured to be operatively coupled to one or more available processing cores and a power source for providing power-regulated transparent multi-core processing. The managing core includes a memory for storing threshold values. The managing core also includes an operational conditions monitoring circuit configured to determine operational conditions, an optimizing circuit configured to compare operational conditions with the threshold values to determine a configuration of processing cores including the managing core and zero or more active processing cores selected from one or more available processing cores, and load distributor circuits configured to distribute power to the one or more available processing cores so that an actual configuration of processing cores corresponds to the configuration of processing cores for optimal power consumption. The managing core also includes input circuits configured to receive a processing request, the processing request configured for execution by a single core, and programmed logic circuits configured to assign the processing request to one of the processing cores in the actual configuration of processing cores. The design structure may include a netlist which describes the managing core. The design structure may reside on the machine readable storage medium as a data format used for the exchange of layout data of integrated circuits.

DETAILED DESCRIPTION

Exemplary methods, systems, and design structures for providing power-regulated transparent multi-core processing according to embodiments of the present invention are described with reference to the accompanying drawings, beginning with FIG. 1. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
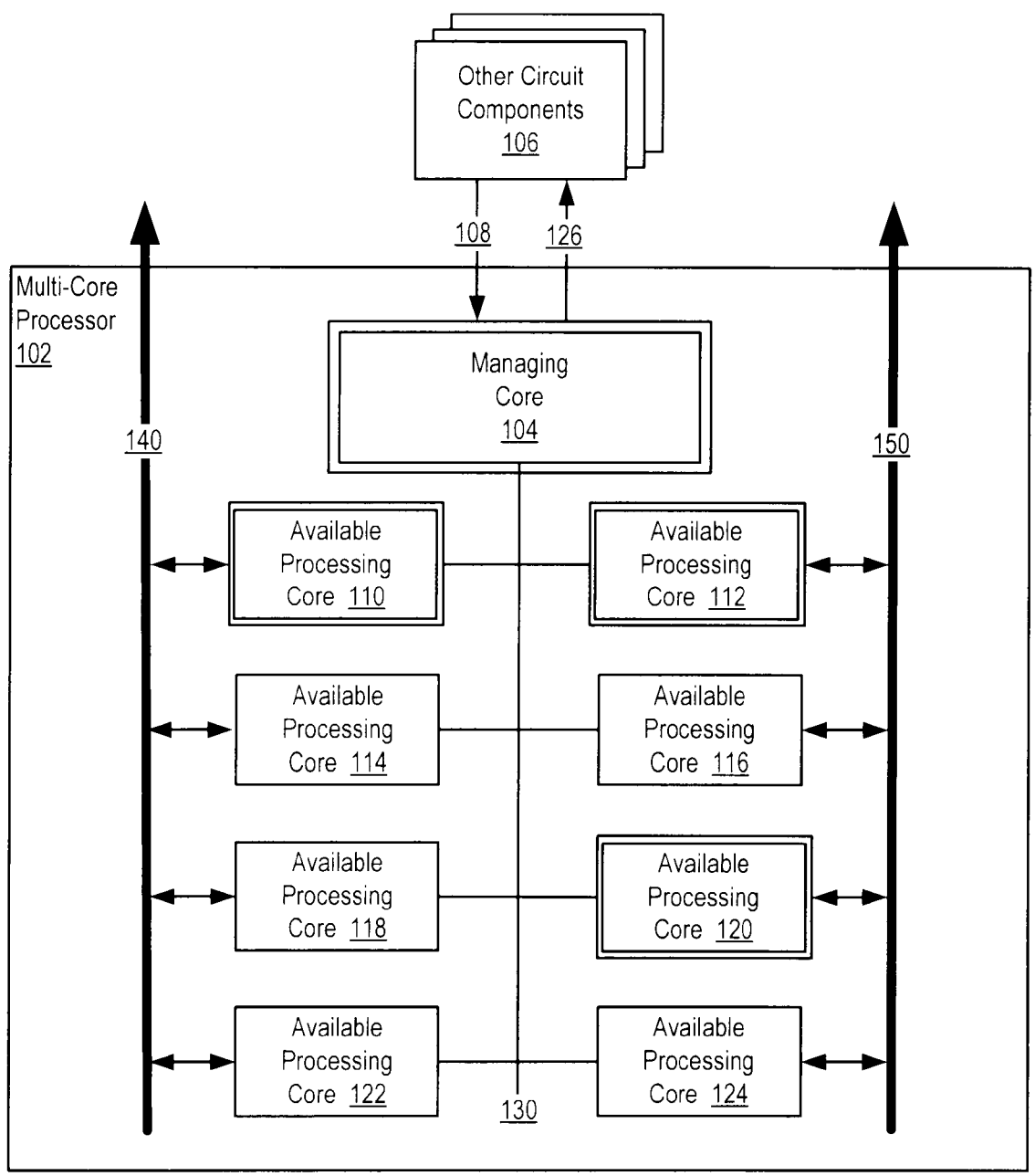
FIG. 1 sets forth a block diagram illustrating a multi-core processor for providing power-regulated transparent multi-core processing.
Figure 2:
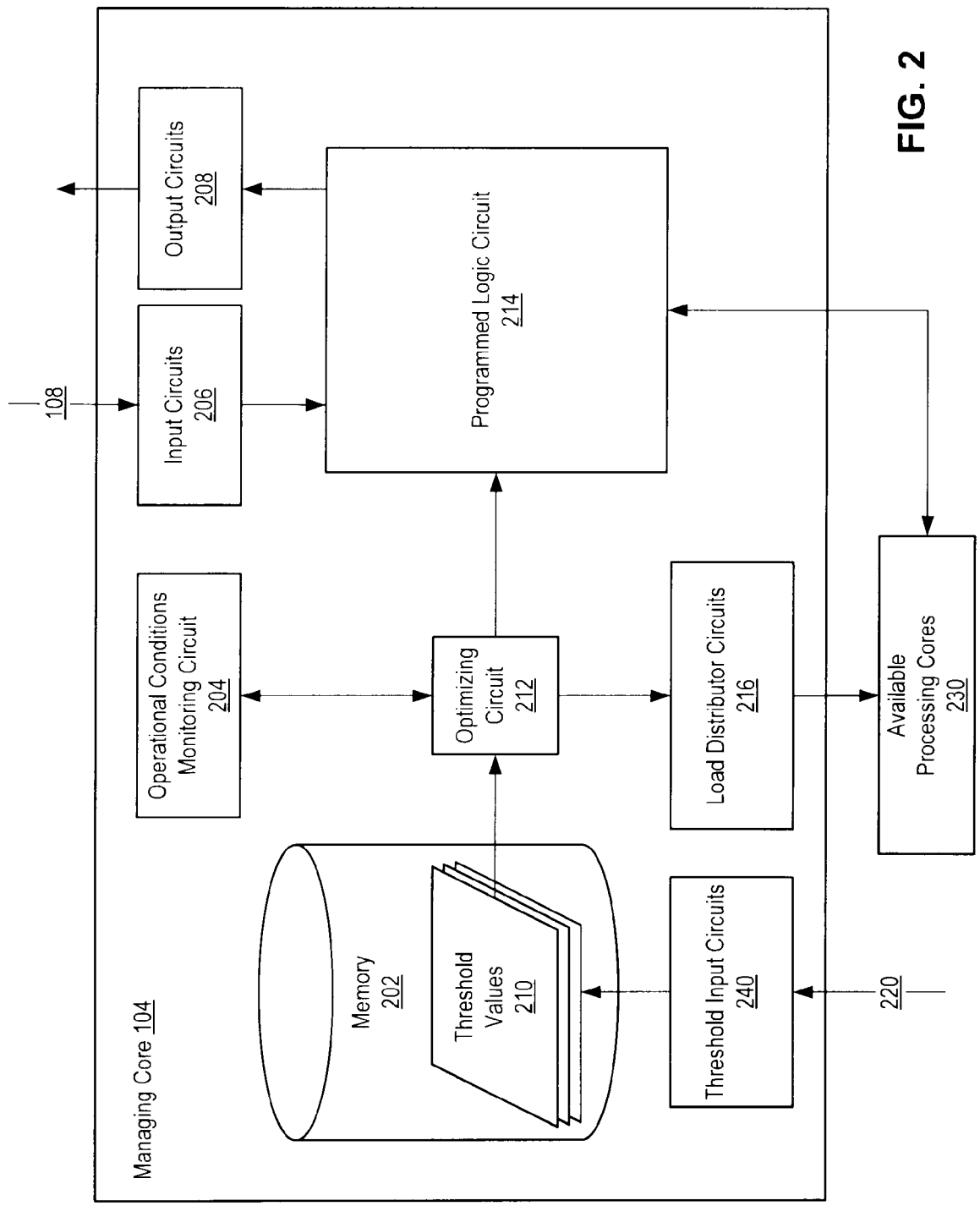
FIG. 2 sets forth a block diagram illustrating a managing core for providing power-regulated transparent multi-core processing.

FIG. 1 sets forth a block diagram illustrating a multi-core processor for providing power-regulated transparent multi-core processing. FIG. 2 sets forth a block diagram illustrating a managing core for providing power-regulated transparent multi-core processing. As will be appreciated by one of skill in the art, the present invention may be implemented as a completely hardware embodiment, as software (including firmware or microcode), or as a combination of hardware and software, all of which are referred to herein as "circuits" or "modules". The multi-core processor 102 and managing core 104, for example, may be implemented as several hardwired circuits, as design structures on a medium or implemented on one or more Integrated Circuits ('ICs'), as one or more software modules executing on any number of embedded processors, or a combination of any of these. The managing core 104 may be implemented as part of the multi-core processor 102 as one or more independent ICs.

The resulting IC chips can be distributed by a fabricator in raw wafer form (that is, as a single wafer that has multiple unpackaged chips), as a bare die, or in a packaged form. In the later case, the chip is mounted in a single chip package (such as a plastic carrier, with leads that are affixed to a motherboard or other high level carrier) or in a multichip package (such as a ceramic carrier that has either or both surface interconnections or buried interconnections). In any case, the chip is then integrated with other chips, discrete circuit elements, and/or signal processing devices as part of either (a) an intermediate product, such as a controller, or (b) an end product. The end product can be any product that includes integrated circuit chips, ranging from toys and other low-end applications to advanced computer products having a display, a keyboard or other input devices, and a central processor.

With reference to FIG. 1, multi-core processor 102 operates generally to receive and execute processing requests 108 (in the form of program code and data manipulated by the program code) from other circuit components 106 in an electronic system and provide output 126 as required. The other circuit components 106 may include one or more buses, memory controllers, registers, caches, or other general or specialized processors in the electronic system. Multi-core processor 102 includes a managing core 104 operatively coupled to the available processing cores 110-124 and a power source (not shown).

Managing core 104 acts as a front end for all processing requests and interrupt requests from the electronic system, thereby abstracting the operation of available processing cores 110-124. The managing core 104 assigns the processing requests 108 to an available processing core 110-124 or, in some cases, to itself. The assignment is invisible to the electronic system. Thus, the multi-core processor 102 appears to the other circuit components 106 to be a single-core processor. Processing requests 106 sent by the electronic system are configured for execution by a single core, thus simplifying software design.

Managing core 104 regulates power consumption intelligently by controlling uptimes of each individual available processing core 110-124 so that additional processing power is employed when desirable. The available processing cores 110-124 transition from zero cycles to full speed operation for brief periods of time at the direction of the managing core 104.

Managing core 104 may include processing elements and function as a processing core in addition to managing the functions of the multi-core processor. In such implementations, the scope of the term "processing core," as used generally herein, includes available processing cores 110-124 and managing core 104.

Managing core 104 may be the primary processor. In some embodiments, managing core 104 processes all incoming processing requests until its processing capacity is exceeded by the processing load. Upon exceeding the processing capacity of the managing core 104, managing core 104 supplements its own processing capabilities with processing capabilities supplied by the available processing cores 110-124 by assigning the processing requests 108 to an available processing core 110-124, as described above. In alternative embodiments, managing core 104 functions as a front end only, or managing core 104 performs processing only when the managing core experiences power conditions outside normal operating parameters, such as, for example, a low-power emergency condition.

The managing core 104 determines a configuration of processing cores for optimal power consumption including one or more active processing cores 110, 112, 120 and distributes power to the available processing cores so that the actual configuration of processing cores corresponds to the configuration for optimal power consumption. The configuration for optimal power consumption is dependant upon operational characteristics of the electronic system, such as, for example, a processing load or remaining power in a battery.

Processing load may include a processing load of active processing cores 110, 112, 120. In implementations where managing core 104 includes processing elements, the processing load may include a processing load of the managing core 104, or of all the processing cores (active processing cores 110, 112, 120 and managing core 104) in the actual configuration. Processing load may be represented as a numerical or percentage load at a specific time or over a time interval. For example, a processing load may be represented by saturation or a utilization percentage (e.g., idle or busy percentage) over a time interval. Saturation is a measure of queued jobs waiting for a processor. For resources that do not queue, saturation may be derived through error counts. Operational characteristics of the system are described in greater detail below with reference to FIG. 6.

Still referring to FIG. 1, connection circuit 130 couples available processing cores 110-124 to managing core 104. Connection circuit 130 may include a main bus, private buses, shared memory, or any other connective circuit components as will occur to those of skill in the art. Processing requests, interrupt requests, and monitoring signals may pass between managing core 104 and available processing cores 110-124 on connection circuit 140. Bypass circuits 140, 150 connect available processing cores 110-124 directly (i.e., without involving the managing core) to other circuit components such as direct memory access, pulse width modulators, analog-to-digital circuits, digital-to-analog circuits, display circuits, watchdog, and data lines.

In FIG. 1, managing core 104 and available processing cores 110-124 have a similar architecture. Alternatively, the managing core 104 may be specifically designed for its managing role. Managing core 104 and available processing cores 110-124 may be compatible with the 8051 processor developed by Intel, the ARM or StrongARM architecture developed by ARM Limited, CPUs such as those developed by Intel and Advanced Micro Devices, or any other processor. In some embodiments, available processing cores 110-124 may be individually designed for specific functions or tasks, or designed to individually meet specific power consumption requirements. In such embodiments, managing core 104 routes process requests to the most appropriate active processing core.

The managing core 104 operates generally to provide power-regulated transparent multi-core processing by determining operational conditions of an electronic system (such as conditions relating to power consumption), determining in dependence upon operational conditions a configuration of processing cores for optimal power consumption including the managing core and zero or more active processing cores selected from one or more available processing cores operatively coupled to the managing core, distributing power to the one or more available processing cores so that an actual configuration of processing cores corresponds to the configuration of processing cores for optimal power consumption, receiving a processing request for the electronic system at the managing core, and assigning the processing request to one of the processing cores in the actual configuration of processing cores.

Referring to FIG. 2, managing core 104 includes an operational conditions monitoring circuit 204 configured to determine operational conditions, an optimizing circuit 212 configured to compare operational conditions with the threshold values 210 to determine a configuration of processing cores for optimal power consumption, and load distributor circuits 216 configured to distribute power to the available processing cores 230. Managing core 104 also includes input circuits 206 configured to receive a processing request 108, output circuits 208, and programmed logic circuits 214. Programmed logic circuits 214 are configured to assign the processing request 108 to one of the active processing cores, as described below.

In FIG. 2, managing core 104 includes a memory 202 for storing threshold values 210. Managing core 104 may also access a memory external to managing core 104 to retrieve threshold values 210. For example, managing core 104 may be implemented as part of a microcontroller, as discussed below with reference to FIG. 4. In some embodiments, threshold values 210 may be stored partly or entirely in a microcontroller memory external to the managing core 104, or on any other external memory.

In some embodiments, managing core 104 may include one or more input lines 220 and a threshold input circuit 240 configured to store threshold values in the memory responsive to signals received at the one or more input lines. This interface may be a Joint Test Action Group ('JTAG') interface. A user, manufacturer, reseller, or a coupled electronic system may configure threshold values in the memory using the interface. For example, in some embodiments, an end-product manufacturer may configure the threshold values for a specific end product by connecting to a JTAG port and accessing a programming module through a JTAG interface.

Managing core 104 is configured to be operatively coupled to a continuous power source and/or a battery power source. The operational conditions monitoring circuit may be configured to detect that the managing core is operatively coupled to the continuous power source. For example, circuits may be configured to set an input line high when a continuous power source is connected, and set the input line low when no continuous power source is connected and the electronic system must run on battery power.

While connected to a continuous power source, the multi-core processor 104 may operate indefinitely in a configuration wherein the available cores are at maximum uptime capacity, should processing demands require it. While operating on battery power, the processor configuration may operate on less than maximum uptime capacity. The memory 202 for storing threshold values 210 may store a first set of threshold values for continuous power and a second set of threshold values for battery power. The optimizing circuit 212 may be configured such that, if the detection circuit detects that the managing core is operatively coupled to the continuous power source, optimizing circuit 212 compares operational conditions with the first set of threshold values to determine a first configuration of processing cores. If the detection circuit does not detect that the managing core is operatively coupled to the continuous power source, the optimizing circuit 212 may compare operational conditions with the second set of threshold values to determine a second configuration of processing cores.

Managing core 104 may include processor circuits configured to process processing requests. These processor circuits may be implemented as part of the programmed logic circuits 214, although it may also be implemented as a separate processor. Memory 202 may contain a lowest threshold value corresponding to the lowest power configuration. The lowest threshold value may be designed to correspond with extremely low battery conditions necessitating curtailment of normal function, for example, a device may be configured with an emergency threshold, below which the managing core cannot conduct nominal operations. The managing core may perform an emergency shut down under extremely low-battery conditions such as, for example, less than 5 percent of battery power remaining. The device may also be configured to display a low power warning under low-battery conditions such as, for example, less than 10 percent. The programmed logic circuits 214 may be configured to assign the processing request to the managing core for processing instead of to one of the available processing cores if operational conditions are less than the lowest threshold value.

Figure 3:
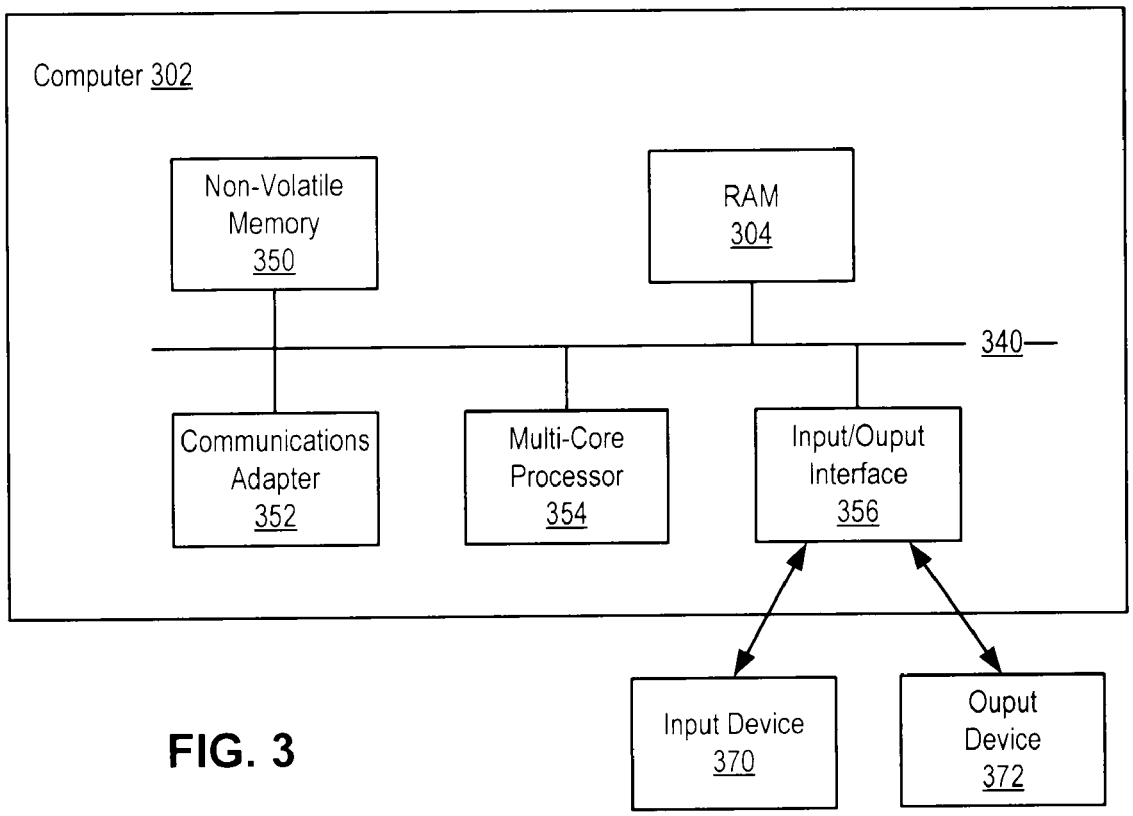
FIG. 3 sets forth a block diagram illustrating a computer including a multi-core processor of the present invention.

Referring to FIG. 3, the multi-core processor may be used to replace a traditional single-core processor in a portable computer, such as a laptop or tablet computer. FIG. 3 sets forth a block diagram illustrating a computer including a multi-core processor of the present invention. Computer 302 includes multi-core processor 354 as well as a computer memory, including both volatile random access memory ('RAM') 304 and some form or forms of non-volatile computer memory 350 such as a hard disk drive, an optical disk drive, or an electrically erasable programmable read-only memory space (also known as 'EEPROM' or 'Flash' memory). The computer memory is connected through a system bus 340 to the multi-core processor 354 and to other system components.

An operating system (not shown) is stored in computer memory. The operating system may be any appropriate operating system such as Windows XP, Windows Vista, Mac OS X, UNIX, or LINUX. Computer 302 also includes one or more input/output interface adapters 356. Input/output interface adapters 356 may implement user-oriented input/output through software drivers and computer hardware for controlling output to output devices 372 such as computer display screens, as well as user input from input devices 370, such as keyboards and mice. Computer 302 also includes a communications adapter 352 for implementing data communications with other devices. Communications adapter 352 implements the hardware level of data communications through which one computer sends data communications to another computer through a network.

Figure 4:
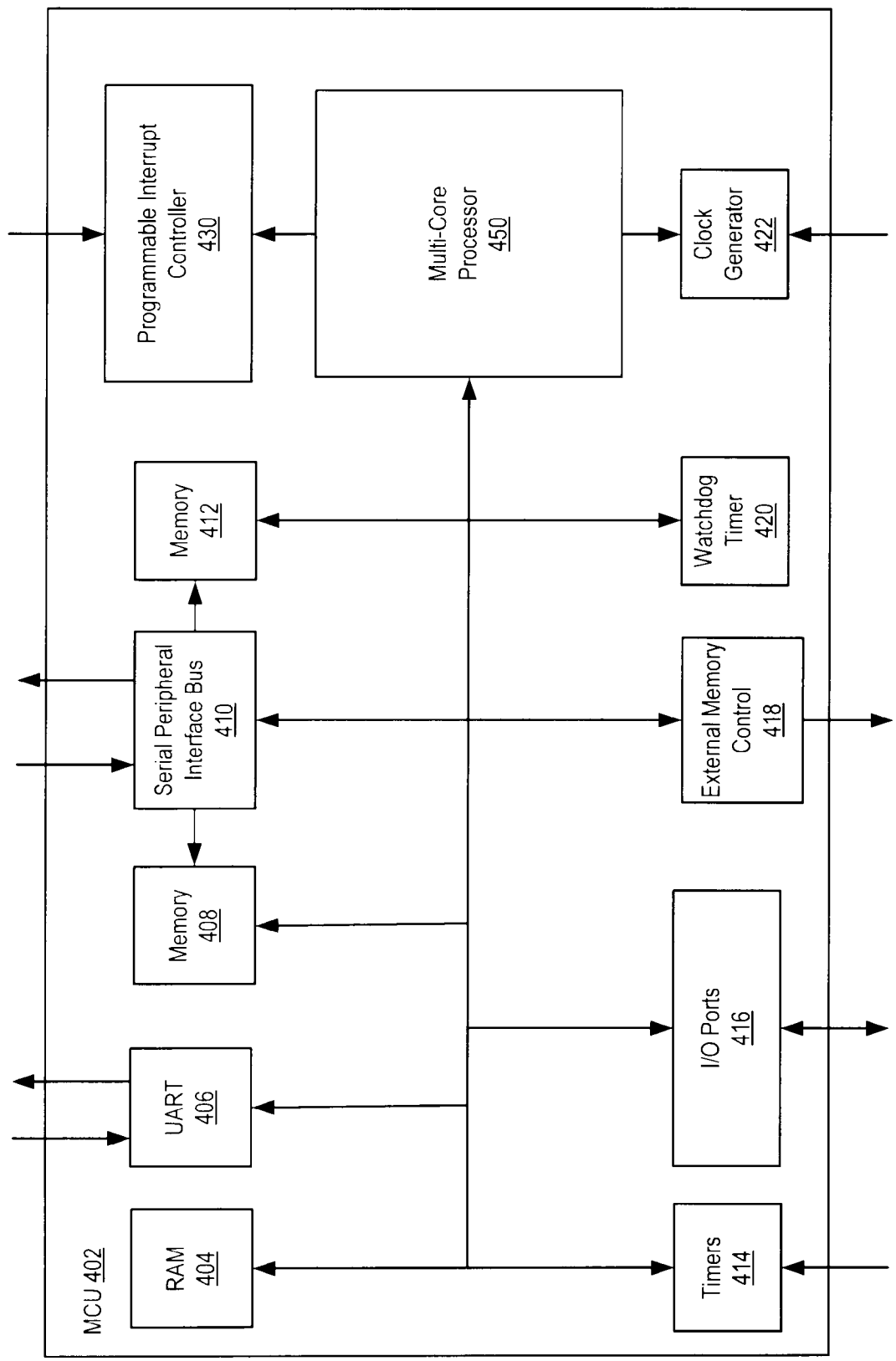
FIG. 4 sets forth a block diagram illustrating a microcontroller including a multi-core processor of the present invention.

Referring to FIG. 4, the managing core and the one or more available processing cores may be embedded cores. FIG. 4 sets forth a block diagram illustrating a microcontroller including a multi-core processor of the present invention. Microcontroller ('MCU') 402 may be used in embedded applications such as personal media players, cellular telephones, toys, remote controls, kitchen appliances, automobiles, and so on. MCU 402 includes a programmable interrupt controller 430, multi-core processor 450, clock generator 422, timers 414, and input/output ports ('I/O ports') 416.

The I/O ports 416 include lines for input and output. A pin may be configurable as an input pin or output pin according to a logic state on the pin. MCU 402 may include multiple ports, with each port including several lines. For example, MCU 402 may have four ports with each port having eight lines for input or output. Programmable interrupt controller 430 receives interrupt requests and responds by interrupting regular program execution. Programmable interrupt controller 430 allows priority levels to be assigned to its interrupt outputs. When the device has multiple interrupt outputs to assert, it will assert them in the order of their relative priority.

Clock generator 422 includes a resonant circuit and an amplifier (not shown). Clock generator 422 produces clock signals for synchronizing the operation of circuits in the MCU 402. The clock signal can be a simple symmetrical square wave or more complex arrangements. Timers 414 count pulses from the clock generator to measure time.

MCU 402 may include both volatile random access memory ('RAM') 404 for data memory and some form or forms of non-volatile electrically erasable programmable read-only memory space (also known as 'EEPROM' or 'Flash' memory) for program memory 408, 412. The computer memory is connected through a system bus 440 to the multi-core processor 450 and to other system components.

MCU 402 may include a serial peripheral interface bus ('SPI') module 410 coupled to program memory 408, 412. The SPI module 410 is a synchronous serial interface module. A user or the electronic system may edit program memory 412 through SPI 410. For example, a user might use SPI module 410 to edit threshold values used for determining a configuration of processing cores for optimal power consumption. In other embodiments, a user or the electronic system may edit program memory 412 by connecting to a Joint Test Action Group ('JTAG') port and accessing a programming module through a JTAG interface. MCU 402 also includes a universal asynchronous receiver/transmitter ('UART') 406. UART 406 is a duplex serial port for serial input and output.

MCU 402 may include an external memory control 418 and a watchdog timer 420. External memory control 418 handles access to memory external to the MCU 402, such as, for example, memory dedicated for personal media storage for a personal media player. Watchdog timer 420 counts clock pulses and resets MCU 402 when a predetermined time period has expired without normal program operations resetting the timer. Thus, if normal operations fail due to a fault condition, watchdog timer 420 will not be reset, and upon reaching the predetermined time period watchdog timer 420 will reset MCU 402 to restart normal operations.

Figure 5:
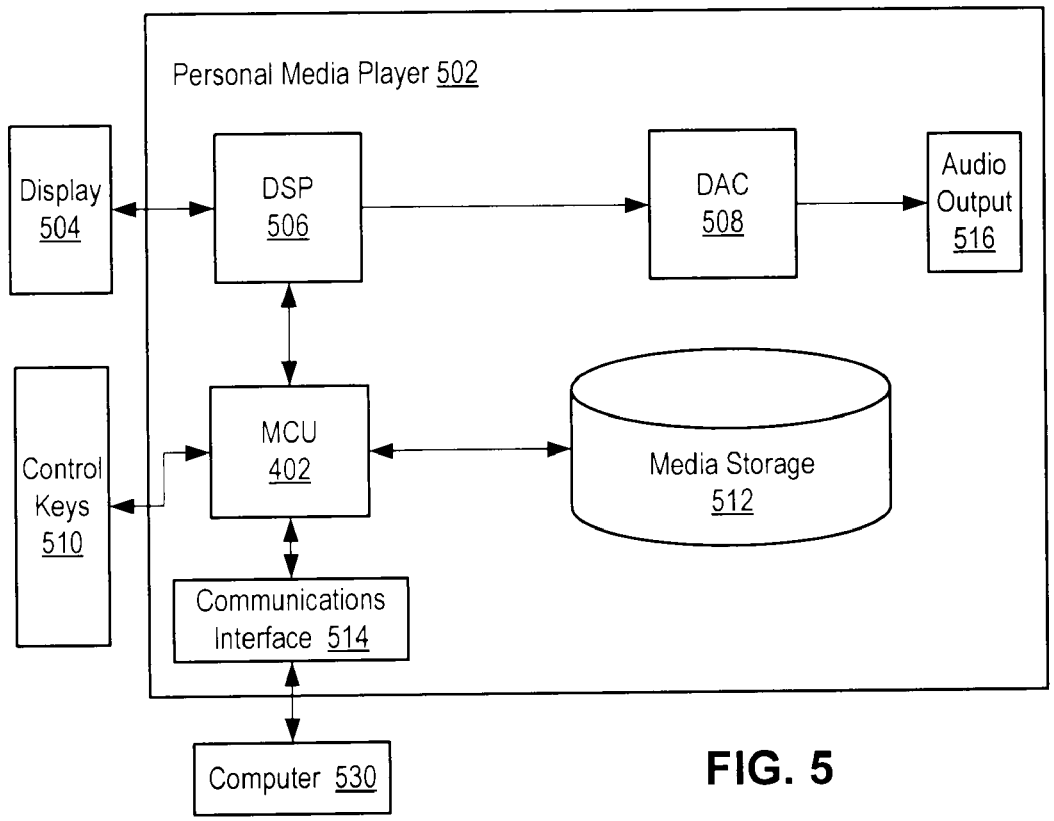
FIG. 5 sets forth a block diagram illustrating a personal media player including a microcontroller for providing power-regulated transparent multi-core processing.

Referring to FIG. 5, the MCU may be used in an end product. An MCU utilizing a managing core as described above may provide end products with expanded functionality while conserving power. FIG. 5 sets forth a block diagram illustrating a personal media player including a microcontroller for providing power-regulated transparent multi-core processing. Personal media player 502 includes MCU 402 for controlling operations of the personal media player 502. MCU 402 includes a managing core as described above with reference to FIG. 2. MCU 402 directs communications interface 514 to connect to computer 530 and download personal media, which MCU 402 then stores in media storage 512. Media storage 512 may be an optical or magnetic disk storage, flash memory, or any other storage device as will occur to those of ordinary skill in the art.

MCU 402 may be configured so that when operational conditions indicate that added processing power is needed, the configuration of available processors in the multi-core processor for optimal power consumption includes additional processors. For example, when connected to a continuous power source and downloading personal media, the configuration of processors for optimal power consumption may include all available processors. By using all available processors, the MCU 402 may be able to offer an expanded feature set, such as, for example, the capability to download at significant speed without interrupting media playback.

MCU 402 may provide a user interface by presenting images on display 504 in conjunction with receiving signals from control keys 510. MCU 402 may receive command signals from control keys 510, such as commands indicating the manipulation of media currently represented on the display by corresponding text or graphics. MCU 402 may cause media to play, pause, rewind, fast-forward or other functions in response to commands. MCU 402 may present media through the audio output 516, display 504, or both by retrieving media from media storage 512 and sending it to digital signal processor ('DSP') 506 for decoding. In the case of audio media. DSP 506 sends the decoded signals to digital-to-analog converter ('DAC') 508, where the signals are converted to analog signals and sent to audio output 516 for play through a speaker. For video media, DSP 506 may send digital signals to a digital display 504.

Figure 6:
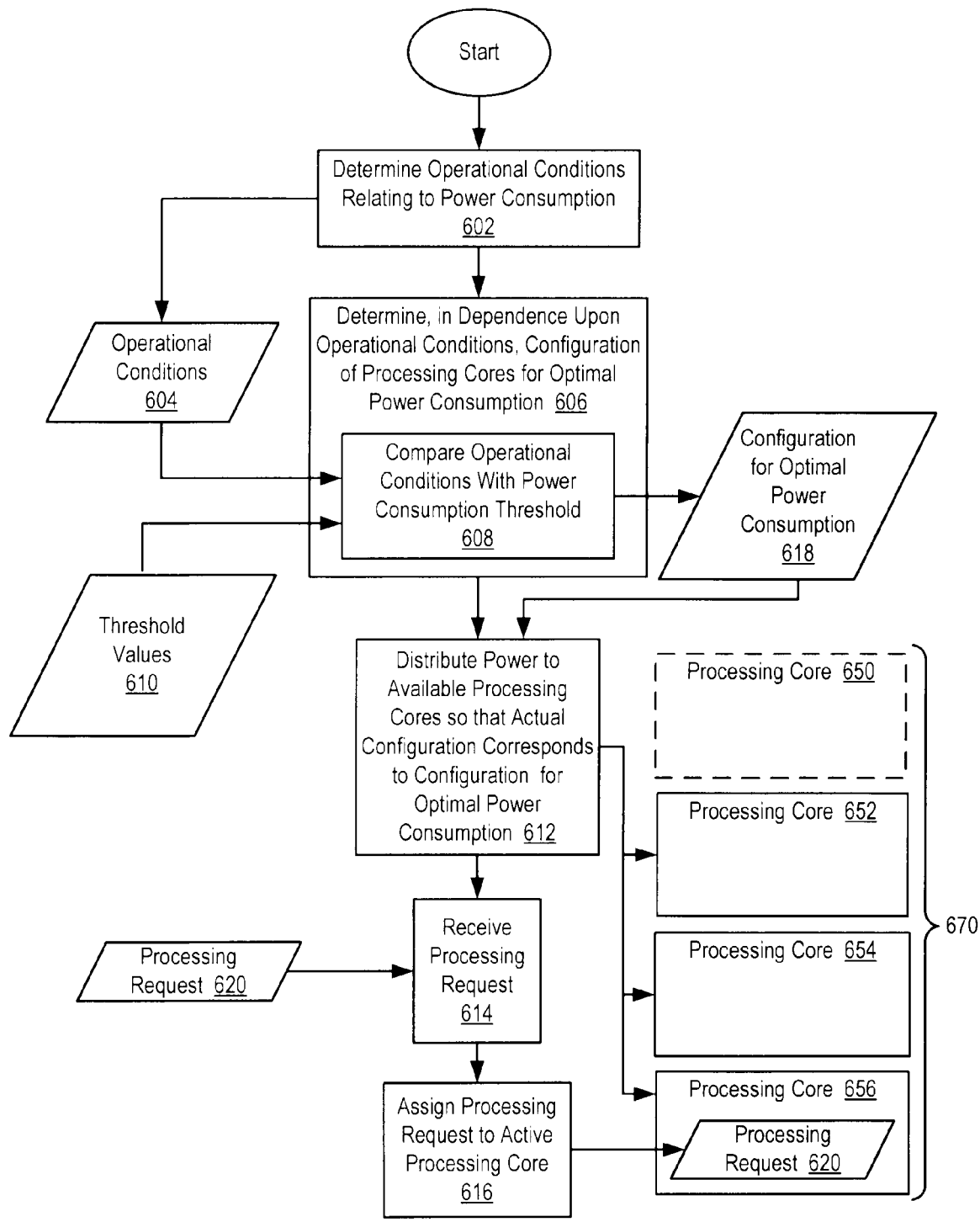
FIG. 6 is a data flow diagram illustrating one embodiment for a method of regulating power consumption in accordance with one aspect of the invention.

FIG. 6 is a data flow diagram illustrating one embodiment for a method of regulating power consumption in accordance with one aspect of the invention. The order of method steps as described herein does not necessarily limit the order in which the steps can be performed.

FIG. 6 illustrates the determination, in a managing core, of operational conditions 604 of an electronic system (block 602). Operational characteristics may include any characteristics of an electronic system related to power consumption or processing requirements, such as, for example, processing demands, power configuration, operating mode, rate of battery drain, task priority, remaining power of a battery power source, a duration of time for which the actual configuration has not been changed, a duration of time for which a certain configuration has been the actual configuration, and so on.

The method includes determining, in dependence upon operational conditions 604, a configuration 618 of processing cores for optimal power consumption including a managing core (not shown) and zero or more active processing cores selected 652, 654, 656 from available processing cores 650, 652, 654, 656 operatively coupled to the managing core (block 606). The method also includes distributing power to the available processing cores 650, 652, 654, 656 so that an actual configuration 670 of processing cores corresponds to the configuration 618 of processing cores (block 612) for optimal power consumption.

Determining a configuration 618 of processing cores for optimal power consumption in dependence upon operational conditions 604 may include determining the configuration 618 in dependence upon rules. A rule may be triggered by specific operational conditions, such as being connected to continuous power. A rule may include selecting a configuration upon operational conditions exceeding or falling below threshold values.

The method also includes receiving a processing request 620 for the electronic system at the managing core (block 614); and assigning the processing request to one of the processing cores in the actual configuration of processing cores, such that the assignment is invisible to the electronic system (block 616). The processing request is configured for execution by a single core, as discussed above. The managing core may assign processing requests on a priority basis according to I/O port or due to a software interrupt.

As illustrated in FIG. 6, the configuration 618 of processing cores (block 606) for optimal power consumption is determined by comparing, in the managing core, operational conditions with at least one of a plurality of threshold values 610 stored in a memory (block 608). As each successive threshold is exceeded, the managing core will power up additional active processing cores for added computing power. Comparing operational conditions with at least one of a plurality of threshold values 610 (block 608) may be done periodically, so that the managing core receives multiple processing requests in between comparisons. In some implementations, such as, for example, where long periods of inactivity occur between processing requests, comparing operational conditions with at least one of a plurality of threshold values 610 (block 608) may be triggered by an incoming processing request.

As discussed above with reference to FIG. 1, available processing cores may be individually designed for specific functions or tasks, or designed to individually meet specific power consumption requirements. In such embodiments, determining the configuration 618 of processing cores (block 606) for optimal power consumption may be carried out in dependence upon the design of individual processing cores, processing requests received, or functions to be performed. In other embodiments, determining the configuration 618 of processing cores (block 606) for optimal power consumption may be carried out in dependence upon a priority assigned to the processing request or to a task to be executed on the electronic system. For example, functions related to an E911 call on a cellular phone may trigger a configuration with full processing capacity.

Figure 7:
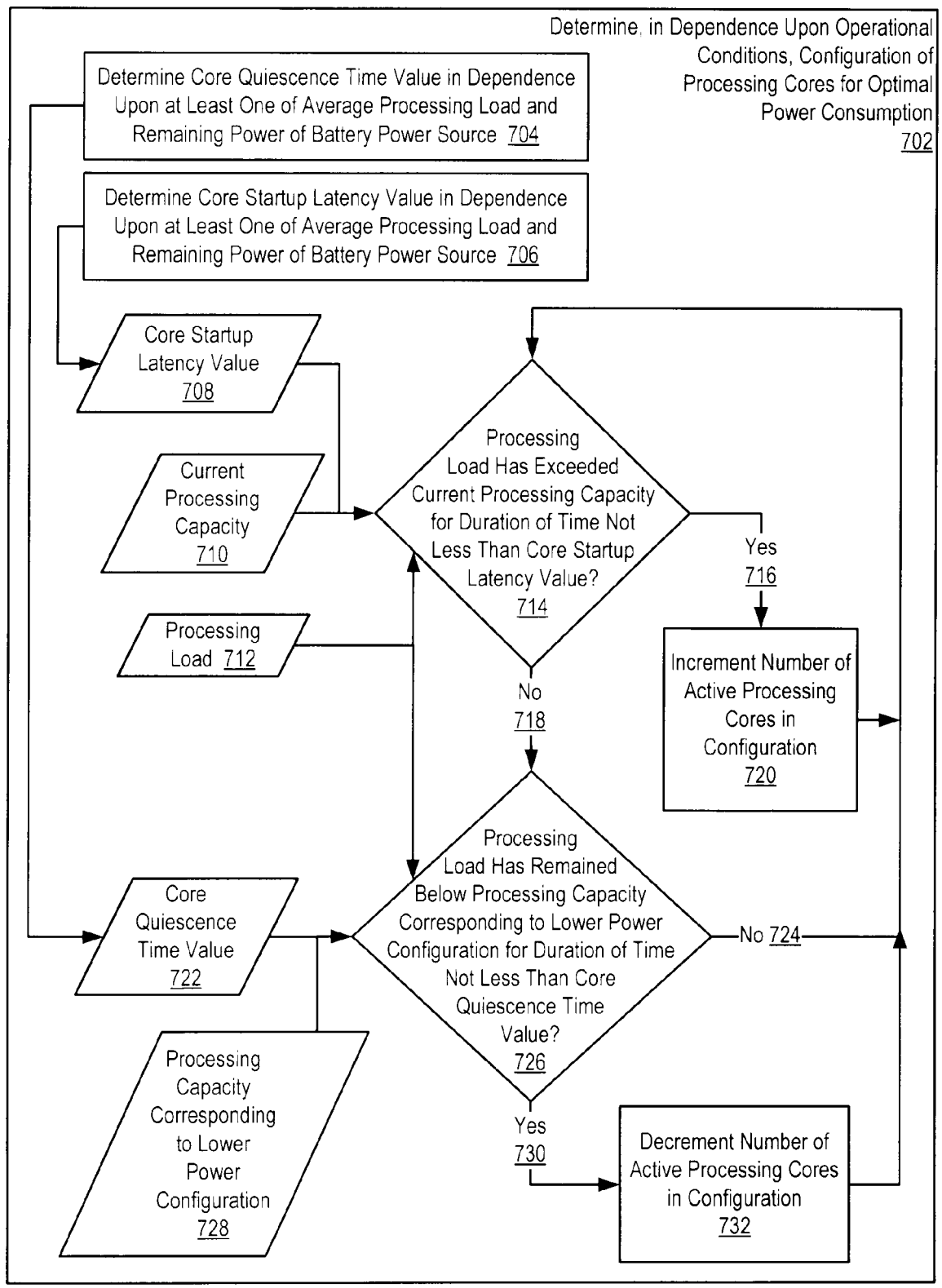
FIG. 7 is a flowchart illustrating determining a processor configuration for optimal power consumption in accordance with one aspect of the invention.

FIG. 7 is a data flow diagram illustrating an exemplary method for determining, in dependence upon operational conditions, a configuration of processing cores for optimal power consumption according to some embodiments of the present invention. Determining a configuration of processing cores for optimal power consumption may be carried out by incrementing or decrementing the number of active processing cores in the configuration for optimal power consumption. The method includes determining whether a processing load 712 has exceeded a current aggregate processing capacity 710 for a duration of time not less than a core startup latency value 708 (block 714). The core startup latency value 708 is a configurable value representing the delay between the system's demands exceeding the current aggregate processing capacity 710 and the managing core's adding processing cores to the configuration for optimal power consumption. Determining whether a processing load 712 has exceeded a current aggregate processing capacity 710 may be carried out by determining that the busy time of the managing core or total system has maintained an average of 100 percent or near 100 percent (e.g., 99 or 95 percent) over a time interval. Determining whether a processing load 712 has exceeded a current aggregate processing capacity 710 may also be carried out by determining that a queue exists, that a queue size exceeds predefined limits, or by error count. The method of FIG. 7 may include determining the core startup latency value 708 in dependence upon at least one of an average processing load and remaining power of a battery power source (block 706).

If the processing load 712 has exceeded the current aggregate processing capacity 710 for the duration of time not less than the core startup latency value 708 (716), the method of FIG. 7 also includes incrementing the number of active processing cores in the configuration of processing cores (block 720) for optimal power consumption. Incrementing the number of active processing cores in the configuration of processing cores for optimal power consumption may be carried out by powering up additional cores as described above. If the processing load 712 has not exceeded the current aggregate processing capacity 710 for the duration of time not less than the core startup latency value 708 (718), the method does not increment the number of processing cores.

The method also includes determining whether a processing load 712 has remained below a processing capacity corresponding to a lower power configuration of processing cores for a duration of time not less than a core quiescence time value 722 (block 726). The core quiescence time value 722 is a configurable value representing the delay between the system's demands falling below the total processing capacity of a configuration having fewer active processing cores and the managing core's powering down processing cores to match that lower configuration. Determining whether a processing load 712 has remained below a processing capacity corresponding to a lower power configuration of processing cores for a duration of time not less than a core quiescence time value 722 may be carried out by determining that the busy time of the managing core or total system has maintained an average of 0 percent or near 0 percent (e.g., 2 or 5 percent), by determining that total busy time of all active processors indicates that one or more active processors are unnecessary, and so on. The method of FIG. 7 includes determining the core quiescence time value 722 in dependence upon at least one of an average processing load and remaining power of a battery power source (block 704).

If the processing load 712 has remained below the processing capacity corresponding to the lower power configuration of processing cores for the duration of time not less than the core quiescence time value 722 (730), the method of FIG. 7 also includes decrementing the number of active processing cores in the configuration of processing cores for optimal power consumption so that the configuration of processing cores corresponds to the lower power configuration of processing cores (block 732). If the processing load 712 has not remained below the processing capacity corresponding to the lower power configuration of processing cores for the duration of time not less than the core quiescence time value 722 (724), the method does not decrement the number of processing cores. Decrementing the number of active processing cores in the configuration of processing cores for optimal power consumption may be carried out by powering down additional cores as described above.

The managing core expends system energy each time it powers up a core, so the managing core avoids an excessive number of startups to conserve energy. The core quiescence time value 722 and the core startup latency value 708 prevent an inefficient hysteresis effect, wherein the actual configuration vacillates rapidly between two configurations. The core startup latency value 708 is calculated such that the managing core increases the number of active processing cores in the configuration for optimal power consumption only when a sustained need for additional processing power is demonstrated by continuous consumption of all processing resources. The core startup latency value prevents the unnecessary or inefficient startup of additional cores due to momentary spikes in processing requirements, which result in inefficient power expenditures to start up a core that is shortly deactivated. The core quiescence time value 722 is calculated such that the managing core decreases the number of active processing cores only when a sustained excess of processing power is demonstrated by a continuously excessive number of active processors. The core quiescence time value 722 prevents unnecessary shutdown of additional cores due to momentary lulls in processing requirements, which avoids wasting energy restarting a core.

For further illustration, consider the exemplary threshold values below.

| Threshold ID (integer) | Remaining Battery Power (percent) | Average PCM Load (percent) | Allowable Core Startup Latency Value (milliseconds) | Core Quiescence Time Value (seconds) |
|---|---|---|---|---|
| 1 | AC | <30 | 20 | 60 |
| 2 | AC | 30 to 50 | 5 | 120 |
| 3 | AC | >50 | 1 | 240 |
| 4 | 85 | <30 | 150 | 6 |
| 5 | 85 | 30 to 50 | 120 | 8 |
| 6 | 85 | >50 | 100 | 10 |
| 7 | 65 | <30 | 250 | 4 |
| 8 | 65 | 30 to 50 | 220 | 6 |
| 9 | 65 | >50 | 200 | 8 |
| 10 | <65 | <30 | 450 | 2 |
| 11 | <65 | 30 to 50 | 420 | 4 |
| 12 | <65 | >50 | 400 | 6 |

Each threshold value, identified by the "Threshold ID," includes a combination of two threshold values: an "Allowable Core Startup Latency Value" and a "Core Quiescence Time Value." In other implementations, the Allowable Core Startup Latency Value threshold value and Core Quiescence Time Value threshold value may be determined separately. The managing core determines the Allowable Core Startup Latency Value and Core Quiescence Time Value in dependence upon a "Remaining Battery Power" threshold value and an "Average PCM Load" threshold value. Upon both the Remaining Battery Power threshold value and the Average PCM Load threshold value being met, the corresponding Allowable Core Startup Latency Value and Core Quiescence Time Value threshold values are used to determine whether to increment or decrement the number of processors, or to maintain the current configuration. For example, upon operational conditions exceeding 85 percent of battery power remaining and an average PCM load of between 30 and 50 percent, the Allowable Core Startup Latency Value and Core Quiescence Time Value of Threshold 5 are used to determine an optimum configuration. In Threshold 5, the Allowable Core Startup Latency Value is 120 milliseconds and the Core Quiescence Time Value is 8 seconds. Thus, processing load must exceed a current aggregate processing capacity for 120 milliseconds or more for the managing core to increment the number of active cores. Conversely, the processing load must remain below a lower-configuration processing capacity for 8 seconds before the managing core decrements the number of active cores to the lower-power configuration.

Figure 8:
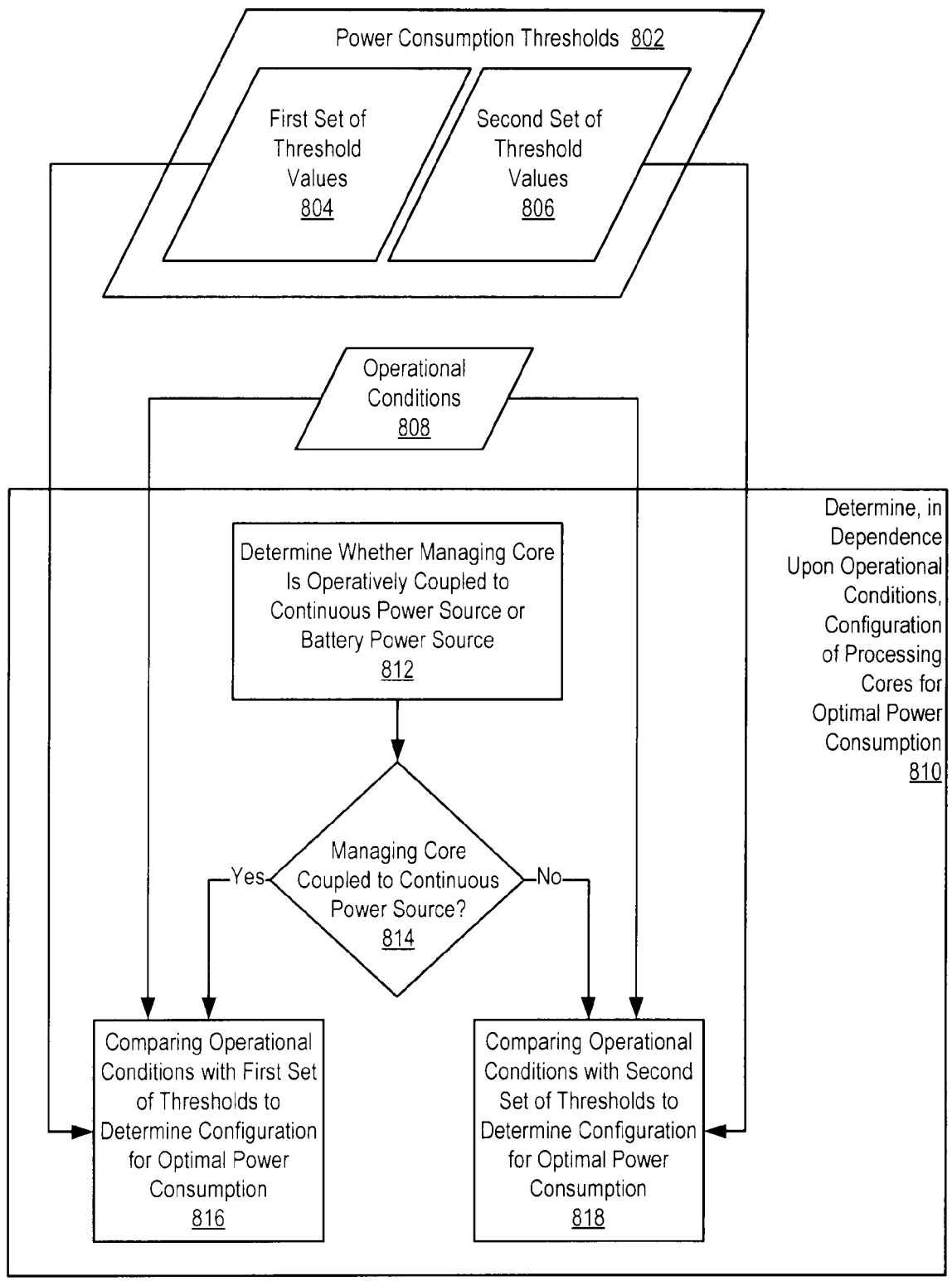
FIG. 8 is a data flow diagram illustrating determining a processor configuration for optimal power consumption in accordance with one aspect of the invention.

FIG. 8 is a data flow diagram illustrating determining a processor configuration for optimal power consumption in accordance with one aspect of the invention. In the method of FIG. 8, the managing core is configured to be operatively coupled to both a continuous power source and a battery power source and the threshold values 802 stored in the memory comprise a first set of threshold values 804 for continuous power and a second set of threshold values 806 for battery power. In the method of FIG. 8, determining, in dependence upon operational conditions 808, the configuration of processing cores for optimal power consumption includes determining whether the managing core is operatively coupled to the continuous power source or the battery power source (block 812). Upon determining that the managing core is operatively coupled to the continuous power source (814), the managing core compares operational conditions with the first set of threshold values 804 to determine a first configuration of processing cores from the plurality of available processing cores (block 816). Upon determining that the managing core is operatively coupled to the battery power source (815), the managing core compares operational conditions with the second set of threshold values 806 to determine a second configuration of processing cores from the plurality of available processing cores (block 818). In some implementations, determining that the managing core is operatively coupled to the battery power source may be carried out by determining that the managing core is not operatively coupled to the continuous power source, such as by detecting that a line where the line voltage is held high when connected to continuous line power is in a low voltage state.

Figure 9:
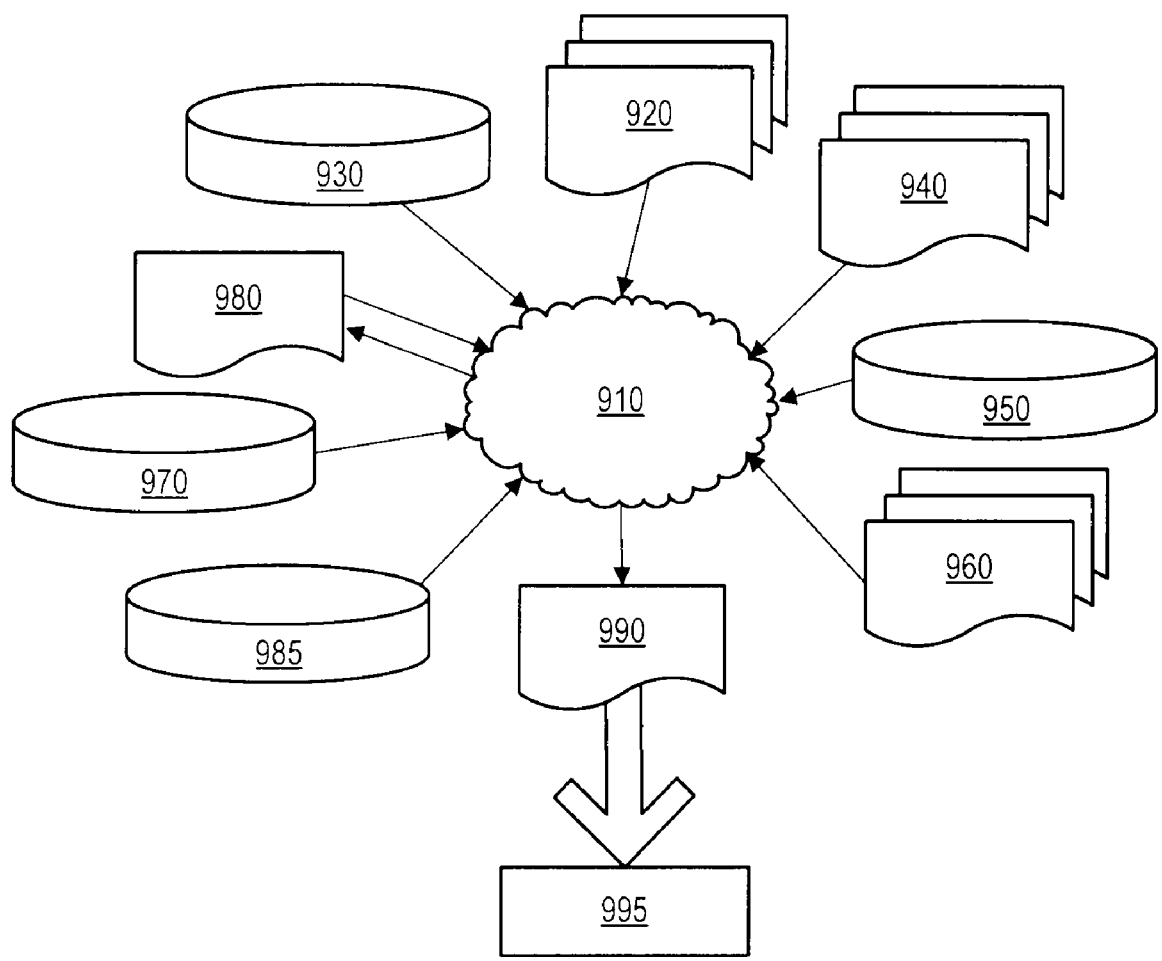
FIG. 9 is a data flow diagram of a design process used in semiconductor design, manufacture, and/or test.

FIG. 9 is a data flow diagram of a design process used in semiconductor design, manufacture, and/or test. Design flow 900 may vary depending on the type of IC being designed. For example, a design flow 900 for building an application specific IC ('ASIC') may differ from a design flow 900 from designing a standard component. Design structure 920 is preferably an input to a design process 910 and may come from an IP provider, a core developer, or other design company, or may be generated by the operator of the design flow, or from other sources. Design structure 920 comprises an embodiment of the invention as shown in FIG. 2 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIG. 2. Design process 910 preferably synthesizes (or translates) an embodiment of the invention as shown in FIG. 2 into a netlist 980, where netlist 980 is, for example, a list of wires, transistors, logic gates, control circuits, I/O, models, etc. that describes the connections to other elements and circuits in an IC design and recorded on at least one of machine readable medium. This may be an iterative process in which netlist 980 is resynthesized one or more times depending on design specifications and parameters for the circuit.

Design process 910 may include using a variety of inputs: for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIG. 2, along with any additional integrated circuit design or data (if applicable) into a second design structure 990. Design structure 990 resides on a storage medium in a data format used for the exchange of layout data of integrated circuits (e.g., information stored in a GDSII (GDS2), GL1. OASIS, or any other suitable format for storing such design structures). Design structure 990 may comprise information such as, for example, test data files, design content files, manufacturing data, layout parameters, wires, levels of metal, vias, shapes, data for routing through the manufacturing line, an any other data required by a semiconductor manufacturer to produce an embodiment of the invention as shown in FIG. 2. Design structure 990 may then proceed to a stage 995 where, for example, design structure 990: proceeds to tape-out, is released to manufacturing, is released to a mask house, is sent to another design house, is sent back to the customer, etc.

It should be understood that the inventive concepts disclosed herein are capable of many modifications. Such modifications may include combinations of hardware and software embodiments, specific circuit designs, combinations of circuits into an IC, separation of an IC into various components, and so on. To the extent such modifications fall within the scope of the appended claims and their equivalents, they are intended to be covered by this patent.

What is claimed is:

1. A method for providing power-regulated multi-core processing comprising:
    determining a configuration of processing cores for optimal power consumption, the configuration of processing cores comprising a managing core and zero or more active processing cores, the active processing cores selected from one or more available processing cores operatively coupled to the managing core;
    receiving one or more processing requests at the managing core;
    the managing core dynamically distributing power to the configuration of processing cores and dynamically retaining or distributing processing requests to the configuration of processing cores, the managing core presenting an appearance of a single core to an electronic system.

2. The method of claim 1 wherein determining the configuration of processing cores comprises comparing, in the managing core, operational conditions with at least one of a plurality of threshold values stored in a memory.

3. The method of claim 2, wherein the managing core is configured to be operatively coupled to either a continuous power source or a battery power source and the plurality of threshold values stored in the memory comprise a first set of threshold values for continuous power and a second set of threshold values for battery power, and wherein determining the configuration of processing cores for optimal power consumption comprises:
    determining whether the managing core is operatively coupled to the continuous power source or the battery power source;
    upon determining that the managing core is operatively coupled to the continuous power source, comparing the operational conditions with the first set of threshold values to determine a first configuration of processing cores; and
    upon determining that the managing core is operatively coupled to the battery power source, comparing the operational conditions with the second set of threshold values to determine a second configuration of processing cores.

4. The method of claim 1 wherein determining the configuration of processing cores comprises:
    selecting a core startup latency value from a set of predetermined core startup latency values stored in memory in dependence upon operating conditions, wherein the predetermined core startup latency values are configured to prevent vacillation of the actual configuration;
    determining whether a processing load has exceeded a current aggregate processing capacity for a duration of time not less than the selected core startup latency value; and
    incrementing the number of active processing cores in the configuration of processing cores for optimal power consumption if the processing load has exceeded the current aggregate processing capacity for the duration of time not less than the selected core startup latency value.

5. The method of claim 4, wherein selecting a core startup latency value from a set of predetermined core startup latency values stored in memory in dependence upon operating conditions comprises selecting a core startup latency value in dependence upon at least one of an average processing load and remaining power of a battery power source.

6. The method of claim 1 wherein determining the configuration of processing cores comprises:
selecting a core quiescence time value from a set of predetermined core quiescence time values stored in memory in dependence upon operating conditions, wherein the predetermined core quiescence time values are configured to prevent vacillation of the actual configuration;
determining whether a processing load has remained below a processing capacity corresponding to a lower power configuration of processing cores for a duration of time not less than the selected core quiescence time value; and
decrementing the number of active processing cores in the configuration of processing cores so that the configuration of processing cores corresponds to the lower power configuration of processing cores if the processing load has remained below the processing capacity corresponding to the lower power configuration of processing cores for the duration of time not less than the selected core quiescence time value.

7. The method of claim 6 further comprising determining the core quiescence time value in dependence upon at least one of an average processing load and remaining power of a battery power source.

8. The method of claim 1 wherein the configuration of processing cores includes the managing core, the method further comprising receiving a processing request at the managing core.

9. The method of claim 8 wherein, if a current processing load is less than a processing capability of the managing core, the configuration of processing cores comprises only the managing core.

10. The method core of claim 8, wherein , the processing request is configured for execution by a single core.

11. A managing core configured to be operatively coupled to one or more available processing cores and a power source, the managing core comprising:
a memory for storing threshold values;
an operational conditions monitoring circuit configured to determine operational conditions;
an optimizing circuit configured to compare the operational conditions with the threshold values to determine an configuration of processing cores including the managing core and zero or more active processing cores selected from one or more available processing cores;
load distributor circuits configured to distribute power to the one or more available processing cores so that an actual configuration of processing cores corresponds to the configuration of processing cores;
processor circuits configured to process processing requests assigned to the managing core;
input circuits configured to receive a processing request, the processing request configured for execution by a single core; and
programmed logic circuits configured to assign the processing request to one of the managing core and one of the one or more active processing cores.

12. The managing core of claim 11 wherein the managing core and the one or more available processing cores comprise embedded cores.

13. The managing core of claim 12, further comprising an interface including one or more input lines and an input circuit configured to store threshold values in the memory responsive to signals received at the one or more input lines.

14. The managing core of claim 12, wherein:
the managing core is configured to be operatively coupled to both a continuous power source and a battery power source;
the memory for storing threshold values stores a first set of threshold values for continuous power and a second set of threshold values for battery power;
the operational conditions monitoring circuit is configured to detect that the managing core is operatively coupled to the continuous power source; and
the optimizing circuit is configured to:
compare the operational conditions with the first set of threshold values to determine a first configuration of processing cores for optimal power consumption if the detection circuit detects that the managing core is operatively coupled to the continuous power source; and
compare the operational conditions with the second set of threshold values to determine a second configuration of processing cores if the detection circuit does not detect that the managing core is operatively coupled to the continuous power source.

15. The managing core of claim 11, and wherein the optimizing circuit is configured such that the configuration of processing cores comprises only the managing core if a current processing load is less than the processing capability of the managing core.

16. A system comprising:
a managing core operatively coupled to a power source and one or more available processing cores configured to execute processing requests, the managing core comprising:
a memory for storing threshold values;
an operational conditions monitoring circuit configured to determine operational conditions;
an optimizing circuit configured to compare the operational conditions with the threshold values to determine a configuration of processing cores for optimal power consumption including the managing core and zero or more active processing cores, the active processing cores selected from the one or more available processing cores;
load distributor circuits configured to distribute power to the one or more available processing cores so that an actual configuration of processing cores corresponds to the configuration of processing cores for optimal power consumption;
processor circuits configured to process processing requests assigned to the managing core;
input circuits configured to receive a processing request, the processing request configured for execution by a single core; and
programmed logic circuits configured to assign the processing request to one of the processing cores in the actual configuration of processing cores.

17. The system of claim 16, wherein the system is an integrated circuit.

18. A design structure embodied in a non-transitory machine readable storage medium for at least one of designing, manufacturing, and testing a design, the design structure comprising:

a managing core configured to be operatively coupled to one or more available processing cores and a power source, the managing core comprising:
a memory for storing threshold values;
an operational conditions monitoring circuit configured to determine operational conditions;
an optimizing circuit configured to compare the operational conditions with the threshold values to determine a configuration of processing cores for optimal power consumption including the managing core and zero or more active processing cores, the active processing cores selected from one or more available processing cores;
load distributor circuits configured to distribute power to the one or more available processing cores so that an actual configuration of processing cores corresponds to the configuration of processing cores for optimal power consumption;
processor circuits configured to process processing requests assigned to the managing core;
input circuits configured to receive a processing request, the processing request configured for execution by a single core; and
programmed logic circuits configured to assign the processing request to one of the processing cores in the actual configuration of processing cores.

19. The design structure of claim 18, wherein the design structure comprises a netlist which describes the managing core.

20. The design structure of claim 18, wherein the design structure resides on the machine readable storage medium as a data format used for the exchange of layout data of integrated circuits.

* * * * *